April 2, 1968  H. C. McLAUGHLIN ET AL  3,375,872
METHOD OF PLUGGING OR SEALING FORMATIONS WITH
ACIDIC SILICIC ACID SOLUTION
Filed Dec. 2, 1965  3 Sheets-Sheet 1

Homer C. McLaughlin
Joseph Ramos
Ronney R. Koch
INVENTORS.

BY Paul H. Leonard

ATTORNEY

Homer C. McLaughlin
Joseph Ramos
Ronney R. Koch
    *INVENTORS.*

BY *Paul H. Leonard*

ATTORNEY

Homer C. McLaughlin
Joseph Ramos
Ronney R. Koch
 INVENTORS.

United States Patent Office 3,375,872
Patented Apr. 2, 1968

3,375,872
METHOD OF PLUGGING OR SEALING FORMATIONS WITH ACIDIC SILICIC ACID SOLUTION
Homer C. McLaughlin, Joseph Ramos, and Ronney R. Koch, Duncan, Okla., assignors to Halliburton Company, Duncan, Okla., a corporation of Delaware
Filed Dec. 2, 1965, Ser. No. 511,141
10 Claims. (Cl. 166—29)

ABSTRACT OF THE DISCLOSURE

A method of plugging or sealing earth formations, employing a low pH silicic acid solution.

SUMMARY OF THE INVENTION

The present invention relates to a new and improved method of plugging or sealing subterranean earth formations employing a silicic acid solution. The present invention particularly relates to an inexpensive water control method for sealing high input zones in secondary recovery waterflood injection wells.

The present invention comprises a method of plugging or sealing earth formations by forming a silicic acid solution having an initial pH of about 1.5 or less, injecting the solution into the earth formation to be sealed, and allowing the silicic acid solution to set into a relatively firm and impermeable mass, thereby sealing the formation.

The present invention provides a method of sealing or plugging formations, openings therein, etc. with silicic acid whereby premature gelling is avoided and the placement of the plugging solution can be completed before gellation begins.

The low pH silicic acid solution is prepared by adding sodium silicate to an acid solution. The acid is always in a sufficient amount to overwhelm the sodium silicate.

Although the silicic acid solution normally has a pH of about 1.5 or less at the time of injection, it can be appreciated that the critical upper pH limit of some silicic acid solutions may vary slightly, either greater or lesser, and accordingly the exact pH at the time of injection will vary slightly, depending upon the nature of the particular sodium silicate employed. The critical upper pH limit always occurred substantially at 1.5 with the sodium silicate used in the laboratory and the field.

Various types of materials have been used in oil wells to seal geological formations therein. Portland cement is one of the more common sealing agents used in oil wells. Some degree of success has been achieved using Portland cement; however there are numerous applications when such cement is ineffective. In sealing a formation, a technique known as "squeeze cementing" is normally used. In performing squeeze cementing, the slurry of portland cement is placed opposite the formation to be sealed and sufficient hydraulic pressure is applied to force the slurry into the formation. As the channels in the formation to be sealed are usually fine capillaries, they are too small to accept cement particles. The hydraulic pressure applied thus causes the formation to "break down" or fracture. With the split or opening of the formation under pressure, a sheet of portland cement slurry fills the crack formed and the capillary system of the formation is left essentially intact and unplugged.

Portland cement can be properly applied when there is a cavity for the reception of it. These cavities may be the annular space between the well casing and the well bore, or a hole through the casing and cement communicating to the formation, commonly called a perforation.

Other materials such as plasters, pitches, swelling gruels, grain, etc. fail to seal formation capillaries, in a manner similar to portland cement. Emulsions are rarely successful because of their inherent resistance to flow in capillaries caused by the "Jamin effect."

The material used as a sealing agent must be a true fluid which is capable of entry and flow in capillaries, and which upon solidification, plugs or seals the capillaries occupied. The true fluid can be either a pure liquid or a solution.

Sodium silicate is a true fluid which is capable of sealing geological formations, but has previously been used with little or no success. Some of these prior art methods of sealing or plugging with sodium silicate are disclosed in U.S. Patents Nos. 2,236,147, 2,198,120, and 2,330,145.

Sodium silicate is a complicated system of various molecular weight silica polymers in an alkaline solution. Aside from requiring a certain minimum amount of alkalinity, sodium silicate has no definite chemical combining numbers. When sodium silicate is acidified to a pH less than about 10 or 11, the sodium silicate is converted largely to silicic acid. Silicic acid exists at these alkaline pH's as it is such a weak acid. Silicic acid is unstable and tends to split out water and polymerize to silica, examples of which are quartz, glass and sand. Instead of precipitating and making silica, $SiO_2$, the silicic acid remains hydrated and forms a three dimensional network in trapping the solvent water. This network is a gel since both phases are continuous.

A slight lowering of the pH brings about radical changes in gel time. Consequently, gel times are difficult to control, and lumping from local acid concentrations during large scale mixing frequently occurs. In Table I hereinbelow, typically a 41° Baumé sodium silicate with a 1:3.22, $Na_2O:SiO_2$, ratio has a pH of approximately 11.5, and as the pH is lowered, expected gel times are decreased. Considerable dilution can be made with little altering of the pH because of a buffering effect.

TABLE I.—41° BÉ. SODIUM SILICATE DILUTED WITH 9 VOLUMES OF WATER

| pH: | Gel time min. |
|---|---|
| 11.5 | Indefinite |
| 10.8 | 420 |
| 10.4 | 120 |
| 10.0 | 12 |
| 9.9 | 4.2 |
| 9.8 | 1.1 |
| 9.2 | 0.3 |

It can readily be seen that slight lowering of the pH brings about radical changes in gel time. This makes gel times difficult to control and causes lumping from local acid concentrations during large scale mixing. It should also be noted that the gel preparation is still alkaline. Although silicic acid is relatively weak, it still ionizes significantly and is thus susceptible to premature gellation upon contact with oil well brines. Brines containing polyvalent ions such as calcium are especially effective in causing premature gellation. Alkaline silicic acid preparations are turbid and tend to become more so as gellation approaches; the gel is opalescent. Turbidity is undesirable when entry and flow in capillaries is desired.

Alkaline silicic acid preparations are difficult to mix, sensitive to brines, and poorly suited for injectivity into capillary systems.

It is therefore the primary object of the present invention to overcome the disadvantages of these prior art systems.

The details of the invention are described hereinafter, together with other features thereof.

The invention will be more readily understood from a reading of the following specification and by reference to the accompanying drawings forming a part thereof, wherein.

Figure 1:
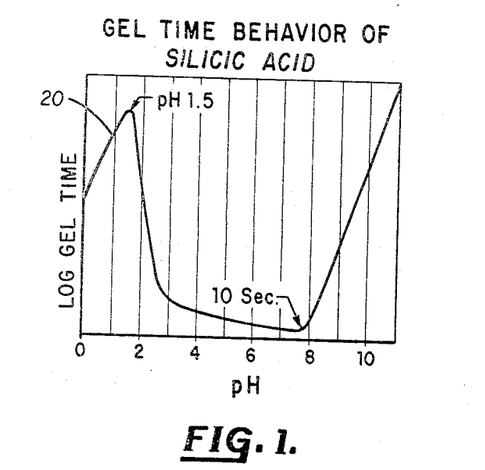
FIG. 1 is a graph illustrating the relationship between gel time of silicic acid and pH.

It has been discovered that in order to effectively utilize a sodium silicate solution or silicic acid solution for sealing underground formations or plugging capillaries, that a pH of 1.5 or less must be maintained. Referring to FIG. 1 of the drawings, alkaline gel times can be seen to reach a minimum pH of about 7.5. Passing through the neutral regions, it is noted that the gel time lengthens as the pH becomes quite acid. The region of interest in the instant invention is the portion of the gel time curve 20 at pH 1.5 and less. In this region, the gel time again decreases with increasing amounts of acid. However, because of the logarithmic character of pH, substantial amounts of acid are required to change the gel time. Also, in this region the ionization of silicic acid is so suppressed by strong acidity that it is insensitive to brine contacts. Contacting of brines in an oil well will therefore not cause sudden premature gellation.

The gelling preparation at pH 1.5 or less has a number of interesting and useful properties. The preparation clarifies when it is mixed and remains essentially clear until it sets to a clear gel. As previously noted, clarity is an indication of easy injectivity. The preparation has a low viscosity, which is essential for quick, low pressure injection into geological formation capillary systems. A silicic acid preparation of a pH of 1.5 or less will also readily set or gel in carbonaceous formations. Rather than delaying the set, carbonates normally speed it up In summary, the advantages of using a silicic acid preparation having a pH of 1.5 or less are: easily controllable gel time; insensitivity to brine contact; low viscosity; no premature plugging of capillary entry ways; and effective gelling in the presence of carbonate formations such as limestone and dolomite.

The silicic acid solution of the present invention must be carefully prepared. Referring again to FIG. 1 of the drawings, it is easily seen that the sodium silicate at pH of 11.5 or more must be acidified to a pH of 1.5 or less. Any delay in the relatively neutral regions between pH 3 to pH 8 will result in irreversible premature gellation, as the gel time in these regions is only a few seconds. It is therefore essential that the pH be changed from 11.5 or more to pH of 1.5 or less as near instantly as possible.

With the small volumes used in laboratory procedures, this instant change of pH is accomplished with relative ease. The sodium silicate solution is always added to the acid so that it is always overwhelmed by the excess acid present. In the laboratory, this is accomplished by pouring the sodium silicate into the acid from a sufficient height to cause agitation.

In large volume mixing, problems develop. Simple paddle or propeller agitation allows areas of relative stagnation to exist. Since a supply of fresh acid is not forthcoming from the stagnant areas, the pH of the sodium silicate becomes locally dominant, resulting in premature gellation. This gellation may be in large masses or smaller particles. The smaller particles are commonly called "flockballs."

Flockballing is the most common ailment in mixing and flockballs have a strong tendency to plug filters. Similarly, the flockballs plaster over the face of a geological formation to be sealed and prevent entry of the low pH silicic acid. A treatment operator in order to displace the silicic acid in a formation before it gels, allows the pressure to rise on the plugged formation until a hydraulic fracture occurs in the formation. Silicic acid then wastefully spurts into the crack or fracture formed. In such a crack, the silicic acid is about as ineffective as portland cement.

In the preparation of a silicic acid solution having a pH of 1.5 or less, mixing is a critical operation and must be carried out with a skillful blend of mechanical and chemical knowledge. The sodium silicate must always be introduced into the acid, and the acid must be in a sufficient amount to always overwhelm the sodium silicate.

Figure 2:
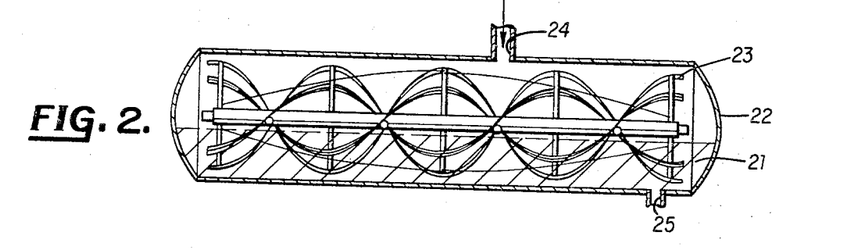
FIG. 2 is a view partly in section of a ribbon blender illustrating a method of mixing a sodium silicate solution and acid with a paddle mixer.

One of the simpler means of mixing the sodium silicate solution and acid, is by the use of a mechanical agitator such as a paddle mixer or ribbon blender. As shown in FIG. 2, a predetermined amount of acid 21 is placed in the tank 22. Subsequently the entire mass of the acid is set into motion by means of the agitator 23. With the acid in motion, the sodium silicate solution is simultaneously introduced into a suitable opening 24 and into the acid 21, under high pressure if desired. As the liquid level rises, the blender maintains agitation of the entire increasing mass. This paddle mixing procedure provides top entry of the sodium silicate solution, simultaneous agitation of the entire mixing mass and control of the sodium silicate solution entry mass, including rate of entry, pressure of entry and diameter of entry stream, thereby insuring a very rapid breakup and diffusion of the sodium silicate into the acid solution. The tank 22 has a suitable opening 25 for ejecting the silicic acid solution therefrom.

Figure 3:
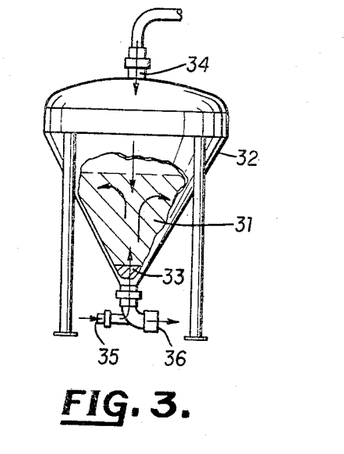
FIG. 3 is a view partly in section of a pneumatic pressure vessel illustrating another method of mixing a sodium silicate solution and acid using compressed air.

Mixing of sodium silicate solution and acid can also be accomplished by releasing compressed air through a diffuser so as to agitate the entire body of the blend as it is created. Referring to FIG. 3, a mass of acid 31 is placed in a pneumatic pressure vessel 32 and then agitated by entry of compressed air via a diffuser 33 from a suitable source (not shown). Air is introduced into the tank 32 through a suitable opening 35. The air in the form of many bubbles causes acid circulation. The sodium silicate solution is introduced through the opening 34 into the tank 32 and hence into the acid 31 at high pressure through a jetting nozzle or other suitable means. An opening 36 is provided in the tank 32 for discharging the silicic acid solution.

The essential elements of this method of mixing are similar to those for paddle mixing.

Figure 4:
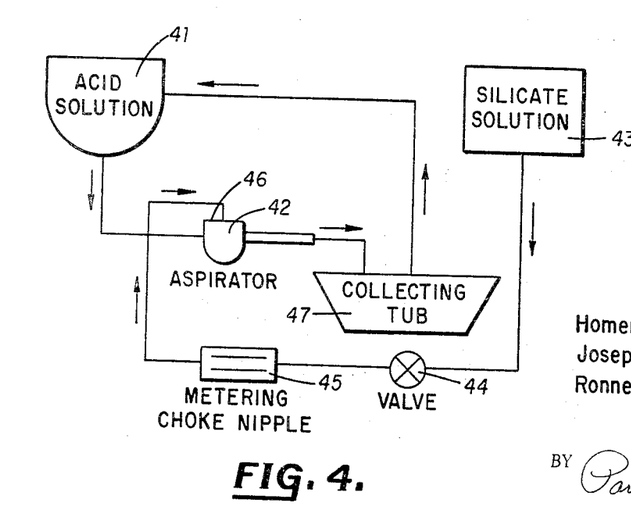
FIG. 4 is a flow diagram illustrating another method of mixing a sodium silicate solution and acid utilizing a continuous jet mixing system or aspirator.

Another method of mixing the sodium silicate solution and the acid, is by means of an aspirator. Referring now to FIG. 4, the acid solution 41 is pumped to an aspirator 42, which may be a converted portland cement jet mixer, from which the acid emerges at high pressure from one or more jets. The high velocity exit of the acid from the aspirator pulls a vacuum causing the sodium silicate solution 43 to be pulled through a control valve 44, through a metering choke nipple 45 and into the aspirator 42 through a suitable opening in a sealing plate 46. Violent agitation by the high velocity acid instantly blends the acid and sodium silicate solution in the aspirator chamber. The momentum from the high velocity jet moves the acid-silicate blend into a collecting tub or tank 47. The collecting tub is preferably a small volume container from which the acid-silicate blend may be continuously pumped and returned to the acid solution 41. At silicate/acid volume ratios of less than 1:1 (e.g., 1:2), the blend must be returned to the acid source from the collecting tub until the sodium silicate solution 43 is exhausted resulting in the blend in the acid tank or solution 41 being the predetermined silicic acid mix. With the 1:1 ratio obtainable with more concentrated acid solutions, the blend may be pumped directly into the geological formation to be sealed. This method of mixing provides top entry of the sodium silicate solution; high velocity flow of acid in the aspirator, including blending of the sodium silicate into the acid, pumping or flowing the blend into a collecting tub, and flowing or pulling by vacuum the sodium silicate solution into the aspirator chamber; and control of the sodium silicate solution entry mass, including a means 44 to adjust the sodium silicate solution to acid solution volume ratio and a means 45 to prevent accidental overdosing with sodium silicate solution while adjusting the valve or means 44.

Figures 5, 6:
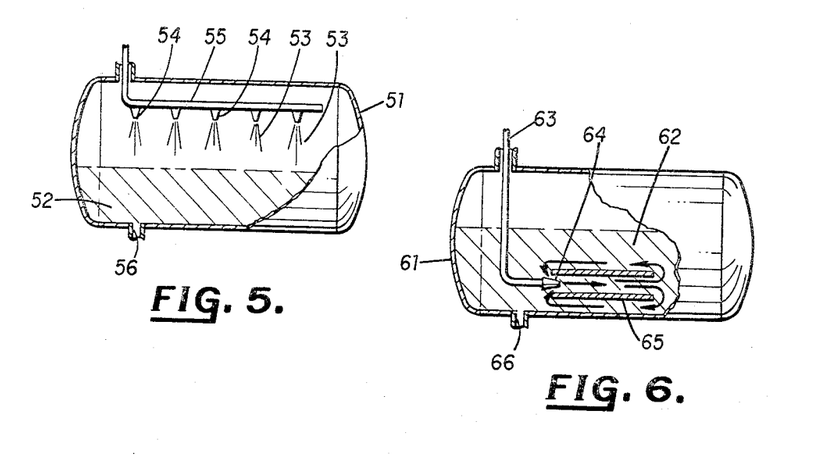
FIG. 5 is a view partly in section of a tank illustrating a sprinkler system method of mixing a sodium silicate solution and acid.
FIG. 6 is a view partly in section of a tank illustrating another method of mixing a sodium silicate solution and acid utilizing an eductor.

A sodium silicate solution may be blended with a hydrochloric acid solution or other suitable acid solution by mixing utilizing a sprinkler system. Referring to FIG. 5, a tank 51 is shown containing a predetermined amount of an acid 52 into which is injected a sodium silicate solution 53. The sodium silicate solution is injected into the acid through one or more sprinkler heads 54 or suitable openings in a pipe 55. The droplets of sodium silicate 53 fall from the sprinkler outlets 54 into the acid solution 52. The droplets are essentially instantly blended into the acid. The newly formed blend of sodium silicate and acid is heavier than the surrounding acid and falls through the acid, further blending and dispersing as it descends. This action sets up a circulation in the acid tank and brings a supply of fresh or relatively fresh acid to the surface as the mixing proceeds. The tank 51 has an opening 56 therein for discharging the silicic acid solution therefrom.

Although not absolutely essential, it is preferred or recommended that the sodium silicate sprinkler stream or droplets not be allowed to strike the acid tank walls. Rolling down the acid tank walls instead of free fall may result in flockballing, coating the walls with premature gel, and/or premature local gellation in the acid tank bottom by stratification.

Although not necessary, mixing may be aided by pressurizing the sprinkler heads. The sprinkler system provides an even distribution of the sodium silicate into the acid.

The sprinkler system provides top entry of the sodium silicate solution; permits free fall of the sprinkler jet stream or droplets through air prior to striking the surface of the acid; and provides for a multiple stream or droplet entry of the sodium silicate into the acid tank.

An eductor may also be used to prepare the silicic acid solution of the present invention. Referring now to FIG. 6, a tank 61 is filled with a predetermined amount of acid 62. A sodium silicate solution is introduced into the tank 61 via a pipe 63, through a jet 64 at high velocity and discharged therefrom into a tube 65. The jet 64 and the tube 65 constitute the eductor. The high velocity jet of the sodium silicate solution emerging from the tube causes circuation in the acid tank. The high velocity jet of sodium silicate solution emerging from the eductor tube draws about five volumes of acid into the eductor tube for each volume of sodium silicate ejected. When the sodium silicate is exhausted, the blend in the acid tank is the desired mix of the low pH sodium silicate. Although not necessary, the acid tank may be agitated by auxiliary means such as another pump. The tank 61 has a suitable opening 66 therein for discharging the silicic acid solution therefrom.

This method of mixing provides for shallow entry of the sodium silicate; high velocity ejection of the sodium silicate solution through the eductor tube; control of the sodium silicate entry mass by jet size; and provision for prevention of acid contamination of the submerged jet. The eductor must be submerged in the acid and must not be allowed to be deeper than about three feet. Approximately one and one-half feet is preferable. The submergence of the eductor must be adjusted. As the acid tank liquid level rises with introduction of the sodium silicate solution, the eductor must be raised. A float or mechanical hoist can be used to adjust eductor submergence. Additionally, the acid must be drawn in the eductor tube aspirator fashion, must be instantly blended with the sodium silicate, and the stream of blended acid and sodium silicate must be disperse rapidly after exit from eductor tube. This is even more important as the end of the mixing cycle draws near.

Each of the mixing methods or procedures illustrated provide for entry of the sodium silicate solution into the acid solution and for sufficient continuous agitation to provide constant overwhelming of sodium silicate solution by the acid. Any other suitable mixing procedure which achieves these purposes, may be used without departing from the scope of the invention.

A proprely mixed silicic acid solution having a pH of 1.5 or less has particular application to thief zones. Thief zones are characterized by the flow of fluids from the well bore into a geological information. This is in contrast to water production in drilling and producing wells where the flow of fluids is into the well bore. Another characteristic of thief zones is that the flow is out of control and constitutes an undesirable drainage of the well bore. Thief zones commonly occur in drilling wells where the drilling mud is lost. Thief zones also occur in producing wells where oil production is lost. Of principal interest to the present invention are thief zones that occur in secondary recovery water flood injection wells.

Figure 7A:
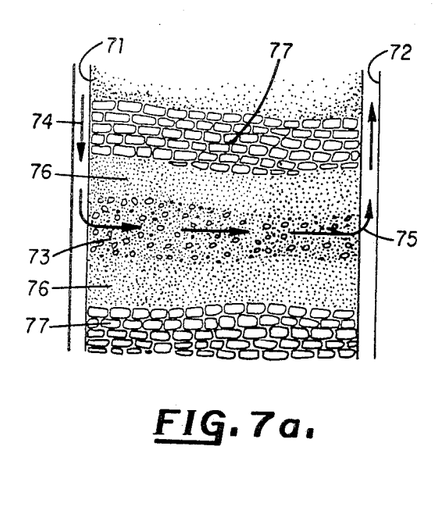
FIG. 7a is a schematic cross section of an injection well and a production well, with the formation therebetween containing a thief zone.
Figure 7B:
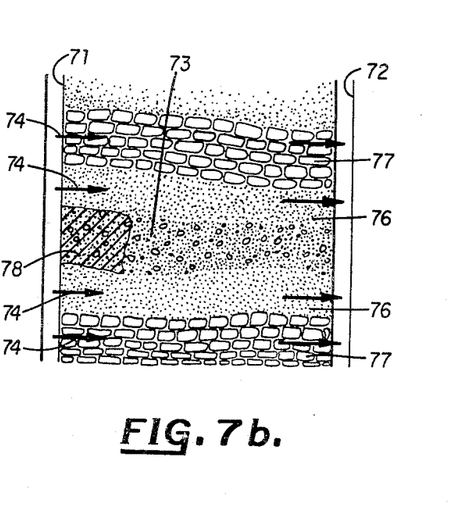
FIG. 7b is a view similar to FIG. 7a wherein the thief zone has been sealed.

Thief zones characteristically require much larger amounts of sealing fluid than producing zones. They also require adequate gel time control to prevent gross overdisplacement of the treating fluid. The relatively low cost of a low pH silicic acid solution and the excellent control of its gel time makes it ideal for treating thief zones. As flow tendency is from the well bore into the thief zone, it is even more ideally suited or sealing such thief zones. Slight leakage into a thief zone is usually tolerable, therefore the syneresis shrinkage is not particularly disadvantageous. Also, any acid bleeding from the low pH silicic acid gel by syneresis exuding or leakage of the seal is dissipated into the formation and does not corrode valuable metal in the well bore. Referring now to FIGS. 7a and 7b, an injection well 71 is being flooded with water to force oil to be produced from the production well 72. The theory and mechanics of such an operation is well known in the art, and is discussed in detail by Morris Muskat in Chapter 12 of his book entitled "Physical Principles of Oil Production," published by McGraw-Hill Book Company, Inc. in 1949. The injection well 71 contains a thief zone 73. During the early part of a waterflood operation, the thief zone may be relatively unnoticed. However, when the injection water illustrated by arrow 74 breaks through at arrow 75 into the production well 72, the result often is a drop in pressure necessary to inject into the thief zone 73, as there is only low viscosity water to be moved. The pressure drop is likely to cause water injection in zones 76 and 77 to drop to an even lower percentage or completely stop.

In FIG. 7b, the thief zone 73 has been sealed in the area 78 with the low pH silicic acid preparation. The injection water 74 now enters the zones 76 and 77 forcing oil into the production well 72.

In this method of the present invention, a silicic acid solution or sol having a pH of 1.5 or less is introduced into a thief zone, including capillaries, cracks, fissures and vugs, and then allowed to form into a gel after a predetermined time, thus sealing the thief zone.

A particular method of placing the low pH sodium silicate solution or silicic acid solution in a desired area is discussed hereinafter. In placing sealing materials, it is customary to isolate the zone to be sealed. Such isolation prevents plugging of geological formations other than the thief zone. In secondary recovery injection wells, it is necessary to remove obstructions such as injection tubing and packers before the placement conduit and isolation assembly can be installed in a well hole. Such removal and installation requires special equipment and is therefore expensive.

The present invention provides a method of placement of a silicic acid preparation having a pH of 1.5 or less in a thief zone occurring in a secondary recovery water flood injection well without removal of the injection water conduits from the well. This method uses the injection water conduits to place the low pH silicic acid solution in the thief zone and by careful technique avoids plugging the conduits or geological formations other than the thief zone. This method also avoids plugging of the injection equipment and gross overdisplacement of the silicic acid material or solution in the thief zone.

In sealing a thief zone in a water flood injection system or in improving or altering the permeability profile of such water flood injection system, an injection profile of the injection well and formation should be made. The injection profile is a log of the proportioning of the injection water into the various geological formations flooded. Such injection profile can be mechanical, radiological or other. The injection profile is usually stated or drawn as a percentage of the flood water entering each interval tested up and down the well hole. A thief zone is shown as taking a disproportionately large percentage of the flood water. A thief zone normally consumes more water than all of the other zones combined.

There are several factors the knowledge of which enables one to defeat the proportioning of sealing agent according to the injection profile.

(1) When injection profiles are run, extra water in excess of the normal flood rate is used. This is to accommodate the sensitivity of logging instruments. The rise in pressure is likely to cause dormant zones to begin accepting water and increase the percentage of water entering other zones. This decreases the percentage of water entering into the thief zone, thus concealing the extent of loss in that zone.

(2) There is normally a localized disruption of the geological formations in the vicinity of the well bore. This disruption is usually vertical fractures; they can occur from hydraulic surges during drilling, cementing the well, perforating the casing, production stimulation, and even in water flooding. If the sealing agent does not penetrate too deeply, the local disruptions prevent sufficient plugging to alter the injectivity of that zone. This incidentally, is one of the reasons such large volumes of sealing agent are required for effective sealing and why surface sealing agents so often fail.

(3) The characteristics of the sealing agent itself.

(a) The silicic acid preparation with a pH of 1.5 or less is very acid. In spite of careful filtering of the flood water, trash accumulates on the face of the formations accepting water. The thief zone, taking more water, accumulates more trash on its face. This has an equalizing effect on the percentage of flood water entering the various zones. The trash is largely acid sensitive being acid soluble (e.g., iron hydroxide) or acid shrinkable (e.g., water swelling clay). The action of the very acidic low pH silicic acid preparation on the trash causes the preparation to enter the thief zone in a higher percentage than the injection profile indicated it should.

(b) Silicic acid is a polymer. When polymers are in solution (or solvated) they exhibit a phenomenon commonly called lubricity. This is a reduction of the friction of fluid flow. Advantage is taken of lubricity when large volumes of fluid are to be pumped in a short time, such as in hydraulic fracturing of oil wells. Small amounts of polymer will reduce power requirements in these operations. In our invention lubricity simply favors fluid entry into the thief zone over entry into other zones.

To seal the thief zone and have other zones relatively unharmed, a low pH silicic acid preparation is pumped at a pressure preferably not exceeding the water flood injection pressure and below formation fracturing pressure. Also, the water flood injection rate is preferably not exceeded.

To avoid the problem of plugging the injection system, the gel time, displacement volumes, and displacement rate are carefully coordinated. The entire volume of silicic acid preparation must be in place in the thief zone, before the gel time expires. This includes a slight overdisplacement with water so that no gel is left in the hole.

Gross overdisplacement is avoided by finding the static fluid level of the well. Some items of useful information are:

(1) Injection rate, pressure and temperature.
(2) Actual determination of the time required to reach hydrostatic equilibrium (static fluid level), if necessary.
(3) The depth on the well of the static fluid level.
(4) The size of the conduit used (for calculating the volume of water in the conduit at static fluid level).

With these determinations only enough displacement water is used to slightly overdisplace the silicic acid solution when the static fluid level is reached.

Figure 8A:
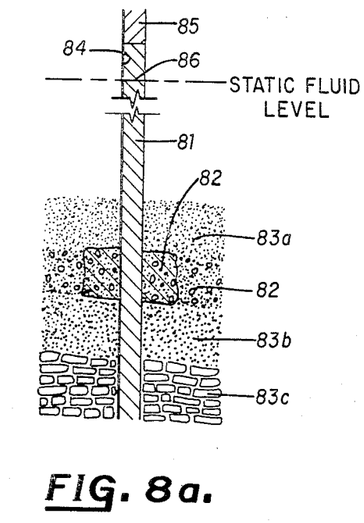
FIG. 8a is a schematic cross section of an underground strata traversed by an injection well illustrating one application of a silicic acid solution.

Referring to the drawings, in FIG. 8a, a silicic acid preparation having a pH of 1.5 or less 81 is displaced at or below the water flood injection pressure, preferably at or below the water flood injection rate. The silicic acid preparation 81 is seen as entering the thief zone 82. The other zones 83a, 83b, and 83c are not accepting the fluid preparation. When the entire volume of the silicic acid preparation 81 is in the thief zone 82 and the injection water conduit 84, only sufficient displacement water 85 is added to slightly overdisplace into the thief zone 82 and fill the injection water conduit 84 to the static fluid level 86.

Figure 8B:
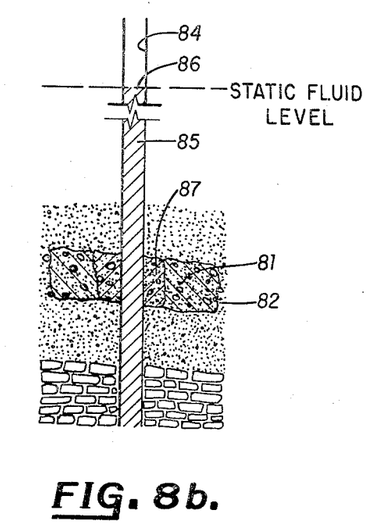
FIG. 8b is a view similar to that of FIG. 8a illustrating the silicic acid solution after placement in a thief zone.

In FIG. 8b, the silicic acid preparation 81 is all placed in the thief zone 82. This condition must be attained before expiration of the gel time. The displacement water 85 has by virtue of its weight settled to the static fluid level 86. Only the volume of the displacement water 85 is present to fill the injection water conduit 84 to static fluid level 86 and provide for slight overdisplacement at 87. The slight overdisplacement at 87 is preferably about one barrel of water or less. Above the static fluid level 86, the injection water conduit 84 contains only gas or air, frequently at partial vacuum.

The gel time of the low pH silicic acid preparation decreases with increasing acid concentration. It also decreases with increasing temperature. Since subterranean temperatures increase with depth and required placement time also increases with depth, the acid concentration must be adjusted to give proper gel time for placement. The gel time should be long enough to place the silicic acid preparation with some safety margin. Nevertheless, the gel time should not be so excessively long that the injection well is shut down too long.

Figure 9:
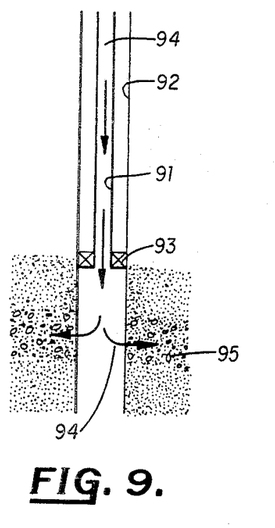
FIG. 9 is a schematic cross section of an underground strata traversed by an injection well illustrating a means of application of sodium silicate solution.
Figure 10:
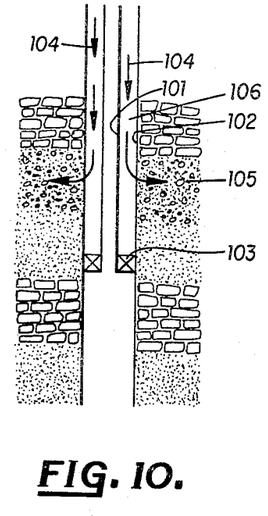
FIG. 10 is a view similar to FIG. 9, illustrating another method of sodium silicate application.
Figure 11:
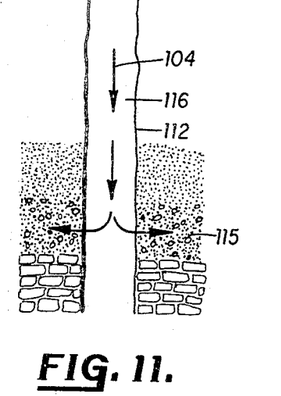
FIG. 11 is a schematic cross section of an underground formation traversed by a well bore, wherein no special injection equipment is in the hole and illustrates still another method of application of sodium silicate solution.

In FIGS. 9, 10 and 11, injection conduits are illustrated. In FIG. 9, the conduit is the tubing 91, which is isolated from the casing 92 by a packer 93. The flow of the silicic acid preparation 94 is down and out of the tubing 91 into the formation or thief zone 95 to be sealed.

In FIG. 10, a common situation is seen, wherein a packer 103 isolates two sets of geological formations from each other. Two conduits are in operation, the tubing 101 and the annular space 106 between the casing 102 and the tubing 104. In this case, the thief zone 105 is in the area of operations served by the annular space conduit. The silicic acid preparation 104 is being injected into the thief zone 105 via the annular space conduit 106 between the tubing 101 and the casing 102.

In FIG. 11, another common case is seen, wherein no special injection equipment is in the hole or conduit 116. The casing 112 provides the conduit. The low pH silicic acid preparation 104 is pumped directly down the casing 112 into the thief zone 115.

The conditions as illustrated in FIGS. 10 and 11 require large volume treatments thereby presenting an extremely economical advantage for using the low pH silicic acid preparation of the instant invention. The techniques described in FIGS. 8a and 8b are readily adaptable to each of the conditions shown in FIGS. 9, 10 and 11. This method of application provides the following:

(1) Use of the injection water conduits undisturbed.

(2) Controlled overdisplacement (a) predetermined static fluid level for the displacement water.
(b) displacement water volume limited to conduit volume below the static fluid level plus a slight overdisplacement volume.

(3) Controlled placement rate and pressure (a) pressure limited to below fracturing pressure preferably to water flood injection pressure or less.
(b) preferable limiting of placement rate to water flood injection rate.

(4) Controlled gel time (a) determination of the gel time accurately.
(b) Use of shortest gel time consistent with safely completing placement.

(5) Resuming the water flood injection after gel time without cleaning the hole.

The following procedure is an example:

(1) Run in injection profile (a) to make sure that there really is a thief zone
(b) to have control data for finding out what the treatment accomplished.

(2) Obtain the injection rate, pressure and temperature.

(3) Determine treatment volume, rate and gel time required.

(4) Mix the silicic acid by one of the methods disclosed in this application.

(5) Displace the silicic acid down the injection system.

(6) Overdisplace slightly.

(a) otherwise "clean-up" problems will be caused by silicic acid gel in the well bore.
(b) The large volumes of silicic acid, economically possible, render the overdisplacement essentially harmless.

(7) Allow the low pH silicic acid preparation to gel.

(8) Renew injection of water into the well.

(9) Run another injection profile.

(a) to find out what happened
(b) to find out if follow up treatments with silicic acid preparation are needed.

(10) Monitor production well response, if there is no response, other injection wells may be offending.

In addition to sodium silicate solutions, other preparations with pH 1.5 or less are those wherein highly alkaline cations such as potassium, guanadine, tetramethyl-ammonium, are substituted for sodium. Potassium silicate is now commercially available. 41° Bé. sodium silicate solution (e.g., Diamond Alkali Grade 40 or Pennsylvania Quartz N Brand) is preferred. Other silicate solutions may be used without departing from the scope of the present invention.

Suitable acid solutions for use in the present invention in addition to the preferred hydrochloric acid are other strong acids such as sulfuric, nitric, trichloroacetic, trinitrobenzoic, etc. The readily available 20° Bé muriatic acid (hydrochloric) is preferred; other hydrochloric acid solutions are useable. Any acid strong enough to maintain the pH of the silicic acid solution at 1.5 or less may be used.

The silicic acid solution is normally prepared in two equal solutions, a sodium silicate solution and an acid solution. Other preparations can be used; however, it is essential that the sodium silicate be diluted with water to reduce viscosity before it is blended into the acid solution.

A preferred sodium silicate solution may be prepared as follows:

Ten parts by volume to 25 parts by volume 41° Bé. sodium silicate solution with a $Na_2O:SiO_2$ ratio of 1:3.22 with addition of water to make a total of 50 parts by volume. A mixture with 16.6 parts by volume 41° Bé. sodium silicate solution is preferred.

A preferred acid solution may be prepared as follows:

Seven parts by volume to 50 parts by volume of 20° Bé. hydrochloric acid with water added to make a total volume of 50 parts by volume. The range in hydrochloric acid required changes with the sodium silicate solution concentration. When the sodium silicate solution is 16.6 parts by volume 41° Bé. sodium silicate solution with a $Na_2O:SiO_2$ ratio of 1:3.22 is diluted with 33.4 parts of water to make the sodium silicate solution A, the acid solution B range is 8 to 30 parts by volume 20° Bé. hydrochloric acid.

The sodium silicate solution is always added to the acid solution B, never the reverse.

Thief zones can be a sandstone, gravel wash, coarse vugged limestone, fissures and cracks in sandstone, shale, dolomite, schist, granite or other geological formations, sedimentary, metamorphic, or igneous. Normally, thief zones are considered to be permeabilities in the order of magnitude of 50 darcys. In secondary recovery injection wells, thief zones are much more relative in nature. Therefore the low limit of thief zone permeability is arbitrarily placed at 250 millidarcys.

The silicic acid solution of the present invention has a viscosity of about 1.5 centipoises.

A number of laboratory tests were performed using silicic acid solution. The results of these tests are recorded hereinbelow:

PROCEDURE

The test solutions were prepared in two parts, solution A and solution B. The composition of the solutions is as follows:

*Solution A*

| | Ml. |
|---|---|
| Grade 40 sodium silicate | 16.7 |
| Water | 33.3 |
| Total solution A | 50.0 |

*Solution B*

| | |
|---|---|
| 1:1 hydrochloric acid | $x$ |
| Water | $50-x$ |
| Total solution B | 50.0 |

1:1 hydrochloric acid was prepared by adding one volume of water to concentrated hydrochloric acid. The concentrated hydrochloric acid is Baker and Adamson, 37.5% HCl, sp. gr. 1.19.

The "$x$" ml. in Solution B ranged from 13 to 50 ml.

Solution A was always added to solution B. Reversing this procedure causes premature gelling. In the laboratory tests, solution A was held about 4 inches above solution B and poured just slow enough to prevent splashing. The last few drops of Solution A were added while stirring as these drops lacked the turbulence necessary for quick mixing. "Flockballs," premature gel particles caused by localized high silicate concentration, are likely to result from these last few drops.

TABLE II.—COMPRESSIVE STRENGTH OF SAND CONSOLIDATIONS

Two tests of two runs each. Both tests at room temperature, ° F. Oklahoma No. 1 Sand.

Solution B:
    Test No. 1—35 ml. 1:1 HCl
    Test No. 2—25 ml. 1:1 HCl
Squeeze pressure: 10 p.s.i.
Column length: 45 inches
Pore volume:
    Theoretical—440 ml.
    35 ml. 1:1 HCl—442 ml. (average)
    25 ml. 1:1 SCl—440 ml. (average)
Total squeeze:
    1,000 ml. or 2.27 pore volumes
Cast core data:
    Diameter—1.477 inches
    Area—1.715 inches
    Cut height—3.0 inches Cores kept submerged in water.

| Time | Compressive Strength, p.s.i. (Average of Three Readings) ||
|---|---|---|
| | 35 ml. 1:1 HCl | 25 ml. 1:1 HCl |
| 2 days | 41.0 | 53.1 |
| 4 days | 32.1 | 36.9 |
| 1 week | 37.1 | 37.1 |
| 2 weeks | 39.5 | 55.1 |
| 4 weeks | 37.4 | 68.8 |
| 8 weeks | 36.2 | 44.0 |

TABLE III.—INTERACTION OF LIMESTONE WITH ACID SODIUM SILICATE

[Limestone used was chat (road gravel). 100 ml. samples used in each case. Volumes given are the average of 3 runs.]

| Solution B, 1:1 HCl | Limestone | Gel Time in Minutes |||||
|---|---|---|---|---|---|---|
| | | 70° F. | 100° F. | 120° F. | 140° F. | 160° F. |
| 30 ml | None | 215 | 91 | 61 | 39 | 23 |
| 23 ml | None | 507 | 201 | 128 | 77 | 41 |
| 18 ml | None | 1,223 | 441 | 294 | 160 | 79 |
| 30 | 50 gms | 241 | 123 | 97 | 63 | 35 |
| 23 | 50 gms | 195 | 126 | 91 | 61 | 32 |
| 18 | 50 gms | 193 | 113 | 76 | 71 | 35 |

TABLE IV.—ACID SODIUM SILICATE WITH ADDITIVES

[100 ml. samples at room temperature, 77° F.]

| Solution B, ml. | Additive || Gel, Time, Minutes | Syneresis, ml. |
|---|---|---|---|---|
| | Chemical | Amount | | |
| 20 | None | None | 850 | 0.6 |
| 20 | $CaCl_2$ | 3 Grams | 540 | 1.1 |
| 25 | None | None | 387 | 1.1 |
| 25 | $CaCl_2$ | 2.5 Grams | 295 | 1.2 |
| 50 | None | None | 36 | 8.2 |
| 50 | $CaCl_2$ | 10 Grams | 10 | 9.9 |
| 50 | $CuSO_5$ | 2.5 Grams | 38 | 8.5 |

Some actual field jobs using a silicic acid solution prepared from solution A and B above are described hereinbelow:

EXAMPLE A

Data

The well treated was located near Wichita Falls, Texas. The well was cased with 4½ in. casing to 3798 ft. Perforations were from 3782 ft. to 3796 ft. Flood injection was through 2 in. tubing with a Shaw Tension Packer set at 3782 ft. A two foot interval of sand (3789–90 ft.) was taking 72% of the flood water as indicated by a tracer survey. The well was taking 300 bbl. of flood water per day at 0 pressure. Bottom hole temperature was 115° F. The flood was with salt water on a 5 spot pattern.

Procedure

A 300 ft.³ bulk cement unit was used to transport the solution A to location. Each 150 ft.³ tank contained 334 gal. (6 drums) of sodium silicate grade 40 and 646 gal. of fresh water.

A 500 ft.³ bulk cement unit was used to transport the solution B to location. Each 250 ft.³ tank contained 646 gal. of fresh water and 304 gal. of 20° Bé. muriatic acid.

The equipment arrived on location at 8:30 A.M. The well was shut in, and a wire line was run 10 minutes later to determine the static fluid level in the well. The static fluid level was found at 1650 ft.

Air was started into one tank of solution B through the pad. One tank of solution A was pumped into the solution B through two ⅜ in. jets mounted in a cross. Pressure was maintained at 1000 p.s.i., and the cross was positioned about 3 inches under the fluid level of solution B. When about 580 gallons of the solution A had been pumped, a large quantity of foam had formed. This operation took 4 minutes 40 seconds. At this point, the cross was removed, and a rigid, open ended 2 in. pup joint was run into the other tank of solution B. The open end of the pup joint was positioned just below the surface of the solution B. Air was bubbled through the solution B, and the second tank of solution A was pumped into it. This operation took 6 minutes 3 seconds. The remaining 400 gal. of solution A in the first tank was then pumped into the first tank of solution B through the open ended pup joint with air bubbling through solution B. The foam was allowed to flow over the top of the tank. It took 5 minutes 20 seconds to transfer the last 400 gallons of solution A into solution B because of the foam. During the entire period of pumping solution A into solution B, air was bubbled through the solution B to provide continuous agitation.

Each time the pumps were stopped, some gel occurred in the pup joints delivering the solution A (dilute sodium silicate). This was anticipated, and the amount was very small. The gel formed in the above manner seemed to be a basic set gel. No flockballs were found in either tank of the final mixture.

The pump on the pump truck which had not been used thus far was used to pump the final mixture of silicic acid into the well. Two barrels of fresh water were pumped ahead of the silicic acid to clear the lines. The pump was slowed down as slow as it would pump, but the silicic acid pumped at 1.5 b.p.m. at 0 pressure. At 11:30 A.M., the silicic acid had been pumped away. Ten minutes after pumping had ceased, the fluid level was found at 1250 ft. by wire line measurement. Two additional bbl. of salt water were pumped. Ten minutes later, the fluid level was at 1590 ft. Total displacement of the tubing and cased hole was 15.2 bbl. The job was completed at 12:30 P.M.

The silicic acid treatment effectively changed the water injectivity profile as readily seen from the Table V hereinbelow:

TABLE V

*Tracer survey prior to treatment*

Depth:                                   $H_2O$
Depth:                               Percent $H_2O$ input
    3784–86 ft. _____________________________ 28
    3788–90 ft. _____________________________ 72

*Tracer survey 3 months after treatment*

3786–88 ft. _____________________________ 34
    3790–90 ft. _____________________________ 46
    3792–96 ft. _____________________________ 20

Prior to treatment with silicic acid, the well was taking 300 b.w.p.d. (barrels water per day) at 0 pressure. After treatment, the well was taking 307 b.w.p.d. at 0 pressure.

EXAMPLE B

A field job using the method of this invention was performed for changing the injectivity profile of a well and plugging a 16 hour channel to the nearest production well. The channel was effectively plugged.

Data

Total depth of the well near Pampa, Texas, was 2981 ft. Seven inch casing was set at 2849 ft., and from 2849 ft. to 2981 ft., the hole was open. Average size of the open hole was estimated as 16 inches. In 1941, the well was shot with 520 quarts of nitroglycerin, and it had been fractured three times since. The formation was brown dolomite, and the temperature was 80° F. to 100° F. Fracture pressure was 800 p.s.i. The normal rate of injection was 400 bbls. per day. The well to be treated was an injection well in a 10 acre five spot flood pattern.

On July 31, 1963, a tracer survey indicated that water was entering the formation as follows:

| Depth (ft.): | Percent water entering |
|---|---|
| 2938–42 | 39 |
| 2942–44 | 8 |
| 2944–48 | 13 |
| 2948–52 | 3 |
| 2952–60 | 15 |
| 2960–64 | 24 |

At that time, the injection rate was 500 b.p.d. at 35 p.s.i.

On a subsequent date the well was plugged back to 2925 ft. with sand, and another profile was run with results as follows:

| Depth (ft.): | Percent water entering |
|---|---|
| 2902–10 | 26 |
| 2910–17 | 12 |
| 2917–24 | 32 |

The remaining 30% of the water was entering the rest of the formation.

Procedure.—Silicic acid formulation

Solution A:

| Grade 40 sodium silicate | drums | 26 |
|---|---|---|
| Fresh water | bbls | 66.6 |
| Total | bbls | 100.0 |

Solution B:

| 20° Bé. muriatic acid | bbls | 24 |
|---|---|---|
| Fresh water | bbls | 76 |
| Total | bbls | 100.0 |

| Total mixture (solution A and solution B) | bbls | 200 |
|---|---|---|

About 2000 gallons of fresh water were put into a 4000 gallon trailer. Twenty-six drums of sodium silicate grade 40 were put into the tank. About one gallon of sodium silicate was left in each drum. The trailer was then filled to 3800 gallons. Since there were no baffle plates in the transport, it was assumed that solution A was thoroughly mixed when it arrived on location. Visual inspection of solution A on location revealed that it was satisfactory.

Two 6000 gallon tanks mounted on a trailer were spotted on location at a previous time. Two acid trucks were used to mix and pump the silicic acid solution. One of the acid trucks hauled 1000 gallons of inhibited 20° Bé. muriatic acid to location. Five hundred gallons of acid were placed into each 6000 gallon tank. Then 38 bbls. of fresh water was added to each tank.

The pump which was previously used to mix the acid and the water (solution B) was used to circulate solution B in one of the 6000 gallon tanks. Solution A was pumped at a rate of 4 to 5 b.p.m. into the tank of Solution B which was being circulated. After about 600 gallons of solution A had been pumped, a considerable amount of "flock" was observed. The rate of pumping solution A into solution B was reduced to between 1 and 1.5 b.p.m. The "flock" did not seem to get worse, so mixing was continued until 1900 gallons of solution A had been pumped. Then 200 gallons of fresh water was pumped into the tank to obtain 100 bbls. of silicic acid solution.

The second 100 bbls. of silicic acid solution was mixed in a similar manner, except solution A was started into solution B at a rate of about 1.5 b.p.m. and reduced to 1 b.p.m. when a small amount of "flock" was observed.

After 200 bbls. of silicic acid solution was mixed, a wire line was run down the well, and the initial fluid level was found at 750 ft.

The clean pump (originally used to pump solution A) was used to pump the final silicic acid mixture into the well. Injection rate down casing was 7 b.p.m. until the casing was loaded (1150 gallons reading on flow meter). The silicic acid mixture was then pumped at 6 b.p.m. at 400 p.s.i. until 4900 gallons (flow meter reading) was in. The rate was then reduced to a 3 b.p.m. at 350 p.s.i. until all of the silicic acid solution was in (meter reading 7920 gallons).

Fresh water was used for displacement. Displacement was started at 3 b.p.m. at 350 p.s.i. until 2500 gallons (flow meter reading) was in. The rate was then reduced to 2 b.p.m. at 375 p.s.i.

When 97 bbls. (stick reading), 3723 gallons (flow meter reading) was displaced, the well stood full and held 375 p.s.i pressure. At this point, the casing was displaced, and the open hole contained silicic acid solution. It was decided that an additional 58 bbls. should be used to displace the open hole. The additional displacement was run at 0.5 to 0.75 b.p.m. at 350 p.s.i. When the additional displacement was complete, a wire line was run, and the top of the gel was found at 2895 ft. The well was shut-in at 3:30 P.M., under a pressure of 375 p.s.i. At 8:00 A.M. next day, fluid level in the well was down six feet. The gel plug was cleaned out of the hole, and the well was put back on injection.

RESULTS

| Date | Water Injection Rate (b.p.d.) | Pressure (p.s.i.) |
|---|---|---|
| 7 Days after Treatment | 111 | 300 |
| 22 Days after Treatment | 300 | 340 |
| 25 Days after Treatment | 370 | 390 |

No detection could be made of the initial 16 hour rapid transit of water from the injection well to the production well.

Broadly, the present invention relates to a new and improved method of plugging or sealing formations, particularly thief zones in water injection wells using a silicic acid solution wherein the pH has been maintained at 1.5 or less.

What is claimed is:

1. A method of plugging or sealing earth formations and the like, comprising the steps of:
   (a) adding a quantity of a dilute silicate solution to a quantity of an acid solution, thereby forming a low viscosity silicic acid solution, said silicate solution being added to said acid solution in a manner and in such amounts that the acid solution always overwhelms the silicate solution, thereby providing substantially instantaneously a silicic acid solution having a pH of about 1.5 or less;
   (b) introducing the low pH silicic acid solution into the earth formation to be sealed; and (c) allowing the silicic acid solution to set into a relatively firm impermeable mass, thereby sealing the formation.

2. The method of claim 1, wherein the silicate is sodium silicate.

3. The method of claim 1, wherein the silicate is selected from the group consisting of sodium silicate, potassium silicate, guanadine silicate and tetramethylammonium silicate.

4. The method of claim 1, wherein the acid is hydrochloric acid.

5. The method of claim 1, wherein the acid is selected from the group consisting of hydrochloric, sulfuric, nitric, phosphoric, trichloroacetic and trinitrobenzoic.

6. A method of sealing or plugging thief zones and the like in water injection wells, comprising the steps of:
 (a) adding a quantity of a dilute silicate solution to a quantity of an acid solution, thereby forming a low viscosity silicic acid solution, said silicate solution being added to said acid solution in a manner and an amount such that the acid solution always overwhelms the silicate solution, thereby providing substantially instantaneously a silicic acid solution having a strongly acid pH of about 1.5 or less;
 (b) introducing the low pH silicic acid solution into a water injection well and into the thief zone to be plugged at or below the water flood injection pressure;
 (c) introducing into the injection well, displacement water in an amount sufficient to slightly overdisplace the silicic acid solution into the thief zone and fill the injection well to its static fluid level; and
 (d) allowing the silicic acid solution to set into a relatively firm impermeable mass, thereby sealing the thief zone and prohibiting the injection water from escaping thereinto.

7. The method of claim 6, wherein the silicate is sodium silicate.

8. The method of claim 6, wherein the silicate is selected from the group consisting of sodium silicate, potassium silicate, guanadine silicate and tetramethyl-ammonium silicate.

9. The method of claim 6, wherein the acid is hydrochloric acid.

10. The method of claim 6, wherein the acid is selected from the group consisting of hydrochloric, sulfuric, nitric, phosphoric, trichloroacetic and trinitrobenzoic.

References Cited

UNITED STATES PATENTS

| | | | |
|---|---|---|---|
| 2,207,759 | 7/1940 | Remiers | 166—29 |
| 2,281,810 | 5/1942 | Stone et al. | 166—29 X |
| 2,330,145 | 9/1943 | Reimers | 166—29 |
| 2,693,857 | 11/1954 | Marshall | 166—29 |
| 2,198,120 | 4/1940 | Lerch et al. | 166—21 |
| 2,236,147 | 3/1941 | Lerch et al. | 166—21 |
| 2,330,145 | 9/1943 | Reimers | 166—22 |

CHARLES E. O'CONNELL, *Primary Examiner.*

IAN A. CALVERT, *Assistant Examiner.*